(12) United States Patent
Peng et al.

(10) Patent No.: US 9,978,422 B2
(45) Date of Patent: May 22, 2018

(54) PLAYBACK REGULATION METHOD AND APPARATUS

(71) Applicant: Huawei Technologies Co., Ltd., Shenzhen (CN)

(72) Inventors: Yuzhuo Peng, Shenzhen (CN); Gang Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 14/977,983

(22) Filed: Dec. 22, 2015

(65) Prior Publication Data

US 2016/0125913 A1    May 5, 2016

Related U.S. Application Data

(63) Continuation of application No. PCT/CN2014/073093, filed on Mar. 10, 2014.

(30) Foreign Application Priority Data

Oct. 28, 2013   (CN) .......................... 2013 1 0516746

(51) Int. Cl.
    *G11B 27/00*     (2006.01)
    *G06F 3/0488*    (2013.01)
    (Continued)

(52) U.S. Cl.
    CPC .......... *G11B 27/005* (2013.01); *G06F 3/0484* (2013.01); *G06F 3/0488* (2013.01);
    (Continued)

(58) Field of Classification Search
    CPC ... G11B 27/005; G06F 3/0484; G06F 3/0488; G06F 3/04883; H04N 9/87; H04N 21/47217
    See application file for complete search history.

(56) References Cited

U.S. PATENT DOCUMENTS 9,213,419 B1 * 12/2015 Cassidy ................... G06F 3/03
2008/0084400 A1  4/2008 Rosenberg
(Continued)

FOREIGN PATENT DOCUMENTS

CN    101308440 A    11/2008
CN    101743531 A    6/2010
(Continued)

OTHER PUBLICATIONS

Partial English Translation and Abstract of Japanese Patent Application No. JPA2012146160, Aug. 2, 2012, 23 pages.
(Continued)

*Primary Examiner* — Mishawn Hunter
(74) *Attorney, Agent, or Firm* — Conley Rose, P.C.

(57) ABSTRACT

A play regulation method and apparatus is presented, which relates to the field of play control of multimedia files, so as to adjust play progress more precisely and reduce misoperations. A technical solution provided in the present disclosure includes: receiving a step and play hybrid regulation operation entered by a user, where the step and play hybrid regulation operation includes both an adjustment instruction for a step speed and a regulation instruction for play progress; and regulating the step speed and the play progress according to the step and play hybrid regulation operation. The present disclosure is applied to a terminal having a media player and a touchscreen.

2 Claims, 11 Drawing Sheets

Receive a step and play hybrid regulation operation entered by a user — 101

Regulate a step speed and play progress according to the step and play hybrid regulation operation — 102

(51) Int. Cl.
*H04N 9/87* (2006.01)
*H04N 21/472* (2011.01)
*G06F 3/0484* (2013.01)

(52) U.S. Cl.
CPC .......... *G06F 3/04883* (2013.01); *H04N 9/87* (2013.01); *H04N 21/47217* (2013.01)

(56) References Cited

U.S. PATENT DOCUMENTS

| | | |
|---|---|---|
| 2009/0077491 A1 | 3/2009 | Kim |
| 2012/0054612 A1 | 3/2012 | Bok et al. |
| 2012/0079386 A1 | 3/2012 | Kim et al. |
| 2012/0151401 A1 | 6/2012 | Hwang |
| 2012/0166950 A1 | 6/2012 | Frumar et al. |
| 2012/0182325 A1 | 7/2012 | Hayashi |
| 2014/0193140 A1* | 7/2014 | Fliderman ............. H04N 5/783 386/343 |

FOREIGN PATENT DOCUMENTS

| | | |
|---|---|---|
| CN | 102419685 A | 4/2012 |
| CN | 102522097 A | 6/2012 |
| CN | 103069491 A | 4/2013 |
| CN | 103116467 A | 5/2013 |
| CN | 103197886 A | 7/2013 |
| CN | 103299645 A | 9/2013 |
| CN | 103558969 A | 2/2014 |
| EP | 2434490 A2 | 3/2012 |
| JP | 20120146160 A | 8/2012 |

OTHER PUBLICATIONS

Foreign Communication From a Counterpart Application, Japanese Application No. 2016-546133, Japanese Office Action dated Jan. 4, 2017, 5 pages.
Foreign Communication From a Counterpart Application, Japanese Application No. 2016-546133, English Translation of Japanese Office Action dated Jan. 4, 2017, 5 pages.
"Mouse Gestures," Retrieved from the Internet: URL:https://wiki.videolan.org/Mouse_Gestures [retrieved on Jun. 17, 2016], Nov. 30, 2009, 2 pages.
"Fast Forward in QuickTime & Speed Reverse with Gestures," Retrieved from the Internet: URL:https://osxdaily.com/2010/11/16/fast-forward-in-quicktime/ [retrieved on Jun. 17, 2016], Nov. 30, 2009, 4 pages.
Foreign Communication From a Counterpart Application, European Application No. 14857372.8, Extended European Search Report dated Jun. 27, 2016, 9 pages.
Partial English Translation and Abstract of Chinese Patent Application No. CN103116467, Dec. 16, 2015, 3 pages.
Partial English Translation and Abstract of Chinese Patent Application No. CN103558969, Dec. 16, 2015, 3 pages.
Partial English Translation and Abstract of Chinese Patent Application No. CN103197886, Jan. 14, 2016, 26 pages.
Foreign Communication From a Counterpart Application, Chinese Application No. 201310516746.3, Chinese Office Action dated Nov. 30, 2015, 10 pages.
Foreign Communication From a Counterpart Application, PCT Application No. PCT/CN2014/073093, English Translation of International Search Report dated Jul. 23, 2014, 2 pages.
Foreign Communication From a Counterpart Application, PCT Application No. PCT/CN2014/073093, English Translation of Written Opinion dated Jul. 23, 2014, 6 pages.
Foreign Communication from a Counterpart Application, European Application No. 14857372.8, European Notice of Allowance dated Mar. 5, 2018, 38 pages.

\* cited by examiner

PLAYBACK REGULATION METHOD AND APPARATUS

CROSS-REFERENCE TO RELATED APPLICATIONS

This application is a continuation of International Application No. PCT/CN2014/073093, filed on Mar. 10, 2014, which claims priority to Chinese Patent Application No. 201310516746.3, filed on Oct. 28, 2013, both of which are hereby incorporated by reference in their entireties

TECHNICAL FIELD

The present disclosure relates to the field of play control of multimedia files, and in particular, to a play regulation method and apparatus.

BACKGROUND

At present, it becomes a mainstream play manner that a user plays a multimedia file using a mobile terminal. During play of a multimedia file, a user generally achieves an objective of regulating play progress by dragging a progress bar in a play process. However, during actual use, a user often cannot precisely control a distance of dragging a progress bar. Therefore, play progress cannot be accurately adjusted according to a need of the user, causing a problem of many misoperations.

SUMMARY

Embodiments of the present disclosure provide a play regulation method and apparatus, so as to adjust play progress more precisely.

To achieve the foregoing objective, the following technical solutions are adopted in the embodiments of the present disclosure.

According to a first aspect, an embodiment of the present disclosure provides a play regulation method, applied to a terminal having a media player and a touchscreen, and including receiving a step and play hybrid regulation operation entered by a user; and regulating the step speed and the play progress according to the step and play hybrid regulation operation; where the step and play hybrid regulation operation includes both an adjustment operation for the step speed and a regulation operation for the play progress; the step speed is a quantity of frames of a media file that are played within a unit time when the user performs a fast forward/fast backward operation on the media player; and the play progress is a position to which the media file is played.

With reference to the first aspect, in a first possible implementation manner of the first aspect, the regulating the step speed and the play progress according to the step and play hybrid regulation operation includes acquiring a direction of the step and play hybrid regulation operation and a moving distance of the step and play hybrid regulation operation on the touchscreen according to the step and play hybrid regulation operation; performing increasing or decreasing adjustment on the step speed according to the moving distance; and regulating the play progress according to an adjusted step speed and the direction; where the terminal stores a correspondence between a length value of a moving distance and a step speed.

With reference to the first possible implementation manner of the first aspect, in a second possible implementation manner of the first aspect, the acquiring a moving distance of the step and play hybrid regulation operation on the touchscreen according to the step and play hybrid regulation operation includes acquiring a moving track of the step and play hybrid regulation operation according to the step and play hybrid regulation operation; acquiring a coordinate detected at a latest time and a starting point coordinate of the step and play hybrid regulation operation according to the moving track; and acquiring the moving distance according to a distance between the coordinate detected at the latest time and the starting point coordinate; where the terminal detects the touchscreen at a preset time interval, so as to acquire the moving track, a coordinate, of the moving track, detected first based on a time sequence is the starting point coordinate of the step and play hybrid regulation operation on the touchscreen, and a coordinate, of the moving track, detected last based on a time sequence is the coordinate detected at the latest time of the step and play hybrid regulation operation on the touchscreen.

With reference to the first possible implementation manner of the first aspect, in a third possible implementation manner of the first aspect, the acquiring a moving distance of the step and play hybrid regulation operation on the touchscreen according to the step and play hybrid regulation operation includes acquiring a moving track of the step and play hybrid regulation operation according to the step and play hybrid regulation operation; acquiring the direction of the step and play hybrid regulation operation according to the step and play hybrid regulation operation; if the direction of the step and play hybrid regulation operation turns from a first direction to a second direction, acquiring a coordinate detected at a latest time and a turning point coordinate according to the moving track of the step and play hybrid regulation operation; and acquiring the moving distance according to a distance between the coordinate detected at the latest time and the turning point coordinate; where the terminal detects the touchscreen at a preset time interval, so as to acquire the moving track, a coordinate, of the moving track, detected last based on a time sequence is the coordinate detected at the latest time of the step and play hybrid regulation operation on the touchscreen, and the turning point coordinate is the first coordinate detected by the terminal after the direction of the step and play hybrid regulation operation turns from the first direction to the second direction; where the first direction and the second direction are different by a preset angle.

According to a second aspect, an embodiment of the present disclosure provides a play regulation apparatus, applied to a terminal having a media player and a touchscreen, the apparatus including a receiving unit configured to receive a step and play hybrid regulation operation entered by a user; and a regulating unit configured to regulate the step speed and the play progress according to the step and play hybrid regulation operation received by the receiving unit; where the step and play hybrid regulation operation includes an adjustment operation for the step speed and a regulation operation for the play progress; the step speed is a quantity of frames of a media file that are played within a unit time when the user performs a fast forward/fast backward operation on the media player; and the play progress is a position to which the media file is played.

With reference to the second aspect, in a first possible implementation manner of the second aspect, the regulating unit includes an acquiring subunit configured to acquire a direction of the step and play hybrid regulation operation and a moving distance of the step and play hybrid regulation operation on the touchscreen according to the step and play hybrid regulation operation; an adjustment subunit configured to perform increasing or decreasing adjustment on the step speed according to the moving distance acquired by the acquiring subunit; and a regulating subunit configured to regulate the play progress according to an adjusted step speed and the direction; where the terminal stores a correspondence between a length value of a moving distance and a step speed.

With reference to the first possible implementation manner of the second aspect, in a second possible implementation manner of the second aspect, the acquiring subunit includes a first moving track acquiring module configured to acquire a moving track of the step and play hybrid regulation operation according to the step and play hybrid regulation operation; a first coordinate acquiring module configured to acquire a coordinate detected at a latest time and a starting point coordinate of the step and play hybrid regulation operation according to the moving track; and a first moving distance acquiring module configured to acquire the moving distance according to a distance between the coordinate detected at the latest time and the starting point coordinate that are acquired by the first coordinate acquiring module; where the terminal detects the touchscreen at a preset time interval, so as to acquire the moving track, a coordinate, of the moving track, detected first based on a time sequence is the starting point coordinate the starting point coordinate of the step and play hybrid regulation operation on the touchscreen, and a coordinate, of the moving track, detected last based on a time sequence is the coordinate detected at the latest time of the step and play hybrid regulation operation on the touchscreen.

With reference to the first possible implementation manner of the second aspect, in a third possible implementation manner of the second aspect, the acquiring subunit includes a second moving track acquiring module configured to acquire a moving track of the step and play hybrid regulation operation according to the step and play hybrid regulation operation; a direction acquiring module configured to acquire the direction of the step and play hybrid regulation operation according to the step and play hybrid regulation operation; a second coordinate acquiring module configured to, when the direction that is of the step and play hybrid regulation operation and acquired by the direction acquiring module turns from a first direction to a second direction, acquire a coordinate detected at a latest time and a turning point coordinate according to the moving track of the step and play hybrid regulation operation; and a second moving distance acquiring module configured to acquire the moving distance according to a distance between the coordinate detected at the latest time and the turning point coordinate that are acquired by the second coordinate acquiring module; where the terminal detects the touchscreen at a preset time interval, so as to acquire the moving track, a coordinate, of the moving track, detected last based on a time sequence is the coordinate detected at the latest time of the step and play hybrid regulation operation on the touchscreen, and the turning point coordinate is the first coordinate detected by the terminal after the direction of the step and play hybrid regulation operation turns from the first direction to the second direction; where the first direction and the second direction are different by a preset angle.

According to a third aspect, a play regulation apparatus is provided, applied to a terminal having a media player and a touchscreen, and the apparatus including a receiver configured to receive a step and play hybrid regulation operation entered by a user; and a processor configured to regulate the step speed and the play progress according to the step and play hybrid regulation operation received by the receiver; where the step and play hybrid regulation operation includes an adjustment operation for the step speed and a regulation operation for the play progress; the step speed is a quantity of frames of a media file that are played within a unit time when the user performs a fast forward/fast backward operation on the media player; and the play progress is a position to which the media file is played.

With reference to the third aspect, in a first possible implementation manner of the third aspect, that the processor regulates the step speed and the play progress according to the step and play hybrid regulation operation includes acquiring a direction of the step and play hybrid regulation operation and a moving distance of the step and play hybrid regulation operation on the touchscreen according to the step and play hybrid regulation operation; performing increasing or decreasing adjustment on the step speed according to the moving distance; and regulating the play progress according to an adjusted step speed and the direction; where the terminal stores a correspondence between a length value of a moving distance and a step speed.

With reference to the first possible implementation manner of the third aspect, in a second possible implementation manner of the third aspect, the acquiring, by the processor, a moving distance of the step and play hybrid regulation operation on the touchscreen according to the step and play hybrid regulation operation includes acquiring a moving track of the step and play hybrid regulation operation according to the step and play hybrid regulation operation; acquiring a coordinate detected at a latest time and a starting point coordinate of the step and play hybrid regulation operation according to the moving track; and acquiring the moving distance according to a distance between the coordinate detected at the latest time and the starting point coordinate; where the terminal detects the touchscreen at a preset time interval, so as to acquire the moving track, a coordinate, of the moving track, detected first based on a time sequence is the starting point coordinate the starting point coordinate of the step and play hybrid regulation operation on the touchscreen, and a coordinate, of the moving track, detected last based on a time sequence is the coordinate detected at the latest time of the step and play hybrid regulation operation on the touchscreen.

With reference to the first possible implementation manner of the third aspect, in a third possible implementation manner of the third aspect, the acquiring, by the processor, a moving distance of the step and play hybrid regulation operation on the touchscreen according to the step and play hybrid regulation operation includes acquiring a moving track of the step and play hybrid regulation operation according to the step and play hybrid regulation operation; acquiring the direction of the step and play hybrid regulation operation according to the step and play hybrid regulation operation; if the direction of the step and play hybrid regulation operation turns from a first direction to a second direction, acquiring a coordinate detected at a latest time and a turning point coordinate according to the moving track of the step and play hybrid regulation operation; and acquiring the moving distance according to a distance between the coordinate detected at the latest time and the turning point coordinate; where the terminal detects the touchscreen at a preset time interval, so as to acquire the moving track, a coordinate, of the moving track, detected last based on a time sequence is the coordinate detected at the latest time of the step and play hybrid regulation operation on the touchscreen, and the turning point coordinate is the first coordinate detected by the terminal after the direction of the step and play hybrid regulation operation turns from the first direction to the second direction; where the first direction and the second direction are different by a preset angle.

According to the play regulation method and apparatus provided in the embodiments of the present disclosure, a terminal receives a step and play hybrid regulation operation of a user, where the step and play hybrid regulation operation includes an adjustment instruction for a step speed, and also includes a regulation instruction for play progress, and the terminal regulates the step speed and the play progress according to the step and play hybrid regulation operation. Regulation of the step speed and regulation of the play progress are integrated, so that regulation of the play progress is more accurate, and misoperations can be reduced.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A method provided in an embodiment of the present disclosure is applied to a terminal having a media player and a touchscreen. The terminal may be a smartphone, a tablet computer, a high-definition player, and the like.

Figure 1:
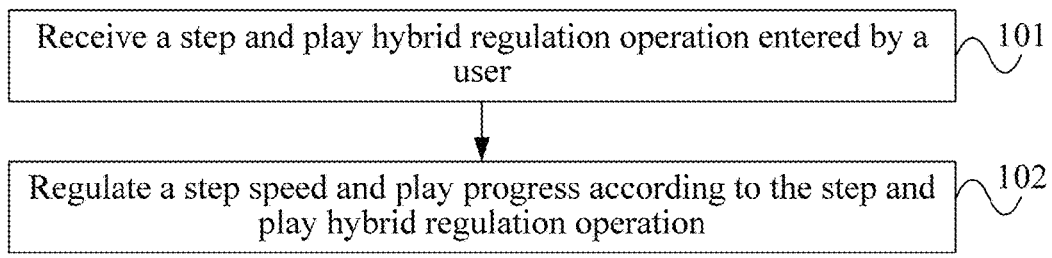
FIG. 1 is a flowchart of a play regulation method according to an embodiment of the present disclosure.

As shown in FIG. 1, an embodiment of the present disclosure provides a play regulation method, including the following steps.

101: Receive a step and play hybrid regulation operation entered by a user.

102: Regulate a step speed and play progress according to the step and play hybrid regulation operation.

The step and play hybrid regulation operation of the user includes an adjustment instruction for the step speed, and also includes a specific regulation instruction for the play progress. The terminal changes the step speed according to the step and play hybrid regulation operation, and adjusts the play progress based on a changed step speed. Regulation of the step speed and regulation of the play progress are integrated into one operation.

The step speed refers to a quantity of frames of a media file that are played within a unit time when the user performs a fast forward/fast backward operation on the media player of the terminal. For example, during normal play of a media file, a quantity of frames per second is 24 frames, and duration of 60 seconds is needed to complete play. In a fast forward state, 30 seconds are needed to complete play, and in this case the step speed is 2*24. When the step speed is increased to 3*24, 20 seconds are needed to complete fast forward play. When the step speed is decreased to 1.5*24, 40 seconds are needed to complete fast forward play. The play progress is a position to which the media file is played. It may be understood that when the step speed is lower, adjustment of the play progress is finer.

By means of the foregoing solution, a terminal receives a step and play hybrid regulation operation of a user, and regulates a step speed and play progress according to the step and play hybrid regulation operation. In this way, regulation of the step speed and regulation of the play progress are integrated, so that regulation of the play progress is more accurate, and occurrence of misoperations is reduced.

A play regulation method provided in an embodiment of the present disclosure is described below in more detail.

Figure 2:
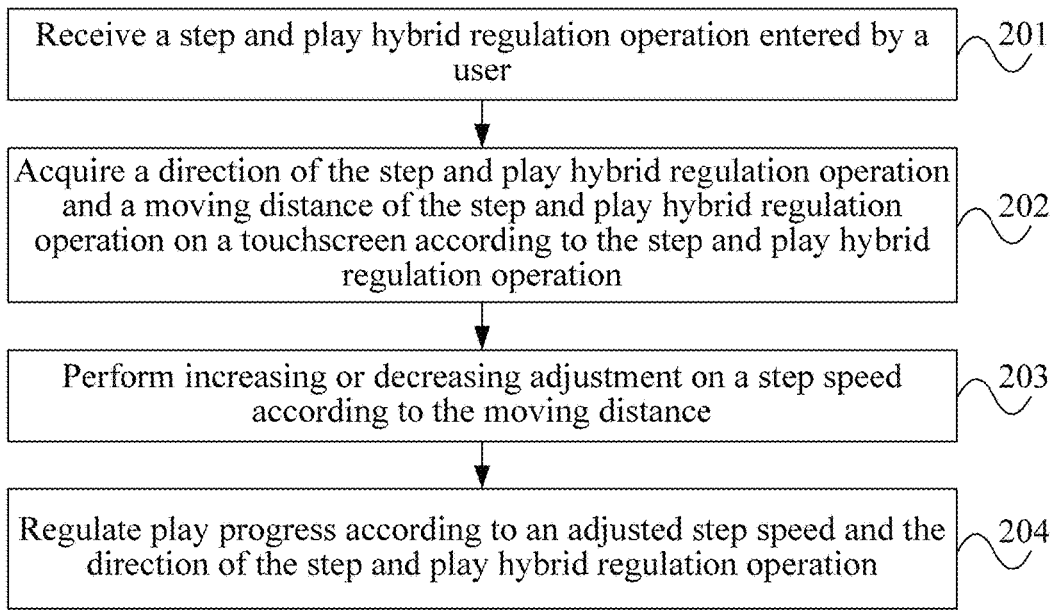
FIG. 2 is a flowchart of another play regulation method according to an embodiment of the present disclosure.

As shown in FIG. 2, a conditional play method is provided, including:

201: Receive a step and play hybrid regulation operation entered by a user.

Before step 201 is performed, a mechanism for detecting the step and play hybrid regulation operation needs to be triggered in a terminal. A slide operation may be performed on a touchscreen to generate a slide instruction for triggering, one preset hardware key or a combination of several preset hardware keys may be used for triggering, a regulating button may be further added to a play page in a play mode and the button is touched for triggering, and the like, which are not limited herein.

202: Acquire a direction of the step and play hybrid regulation operation and a moving distance of the step and play hybrid regulation operation on a touchscreen according to the step and play hybrid regulation operation.

203: Perform increasing or decreasing adjustment on a step speed according to the moving distance.

204: Regulate play progress according to an adjusted step speed and the direction of the step and play hybrid regulation operation.

A specific method of acquiring the moving distance may be as follows:

S1: Detect coordinates of a moving track of the step and play hybrid regulation operation.

The coordinates in S1 include a starting point coordinate of a start point of the moving track and other coordinates of the moving track that are acquired before the step and play hybrid regulation operation ends. The terminal may trigger, based on a predetermined time interval, an action of detecting a coordinate, and specific settings of the time interval may be set by a technician.

S2: Obtain the direction of the step and play hybrid regulation operation and the moving distance according to a coordinate detected at a latest time and the starting point coordinate of the step and play hybrid regulation operation.

According to the description in S1 and S2 above, after receiving the step and play hybrid regulation operation, the terminal may acquire a series of coordinate points, where a coordinate detected first is the starting point coordinate and is set to (X1,Y1), and the coordinate detected at the latest time is set to (Xn,Yn). A moving direction of the step and play hybrid regulation operation and the moving distance on the touchscreen may be determined according to values of the two coordinates.

For example, if the direction of the step and play hybrid regulation operation is a direction A, increasing or decreasing adjustment is performed on the step speed according to the moving distance, and the play progress is regulated forward based on an adjusted step speed.

The play progress being regulated forward in this embodiment of the present disclosure refers to that fast forward regulation is performed on a media file being played.

If the direction of the step and play hybrid regulation operation is a direction B, increasing or decreasing adjustment is performed on the step speed according to the moving distance, and the play progress is regulated backward based on an adjusted step speed.

The play progress being regulated backward in this embodiment of the present disclosure refers to that fast backward regulation is performed on a media file being played.

A correspondence between a length value of a moving distance and a step speed is stored in the terminal.

It is set that a specific relationship between a length of a distance from a start point to an end point of a touch operation and a step speed is shown in Table 1 below.

TABLE 1

| Step speed | Length of distance |
|---|---|
| 1.5*24 frames/second | 1 centimeter |
| 2*24 frames/second | 2 centimeters |
| 3*24 frames/second | 3 centimeters |
| . . . | . . . |

The correspondence in Table 1 is used as an example, and the specific relationship between a length of a distance from a start point to an end point of a touch operation and a step speed is not limited to the content shown in Table 1.

Figure 3A:
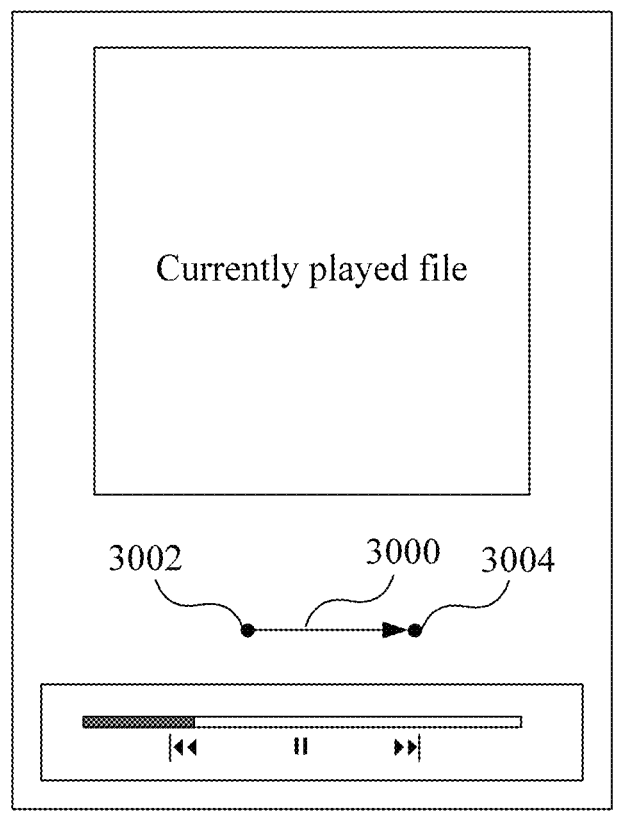
FIG. 3A is a schematic diagram of a step and play hybrid regulation operation according to an embodiment of the present disclosure.

It should be noted that the terminal can correctly distinguish between the direction A and the direction B mentioned above. Therefore, it may be predefined that an included angle between the direction A and the direction B is within a first preset angle range. For example, the first preset angle range is (160 degrees to 180 degrees). In addition, the direction A may be set based on a manner suitable for a use habit of a user. For example, for the terminal, a play progress bar of a media file may usually be displayed in a display interface. After play starts, the progress bar moves from left to right, as shown in FIG. 3A. Therefore, it may be set that a direction from left to right along the progress bar is the direction A, and a direction whose included angle from the direction A is within the first preset angle range from 160 degrees to 180 degrees is the direction B. In an actual case, an angle range may be set for the direction A. For example, a direction within ±15 degrees from a direction from left to right along the progress bar is recognized as the direction A, so that a requirement for precision of an operation of a user may be reduced, thereby improving user experience.

The above description of the direction A and the direction B is only exemplary, and in actual application, the direction A and the direction B may be further distinguished in other manners, so as to correctly recognize fast forward and fast backward, and details are not described herein again.

In this embodiment, the step and play hybrid regulation operation entered by the user includes an operation in contact with the touchscreen, and a floating operation. These input operations are used to generate moving distance data and moving direction data. In addition, the step and play hybrid regulation operation may be a gesture sensing operation of the user or an operation implemented using a stylus, and is not limited herein.

Step 203 and step 204 are described below in detail with reference to schematic diagrams.

In FIG. 3A, a gesture operation 3000 is shown. In the gesture operation 3000, a point 3002 is a start touch point, and a point 3004 is an end touch point. The gesture operation has a direction A to right horizontally. If the terminal has triggered the step and play hybrid regulation operation, the gesture operation 3000 is recognized by the terminal as the step and play hybrid regulation operation. According to coordinates of the point 3002 and the point 3004, a moving distance is calculated, the step speed is adjusted according to a correspondence, stored in the terminal, between a length value of a moving distance and a step speed, and the terminal then regulates the play progress forward based on an adjusted step speed, that is, performs fast forward.

Figure 3B:
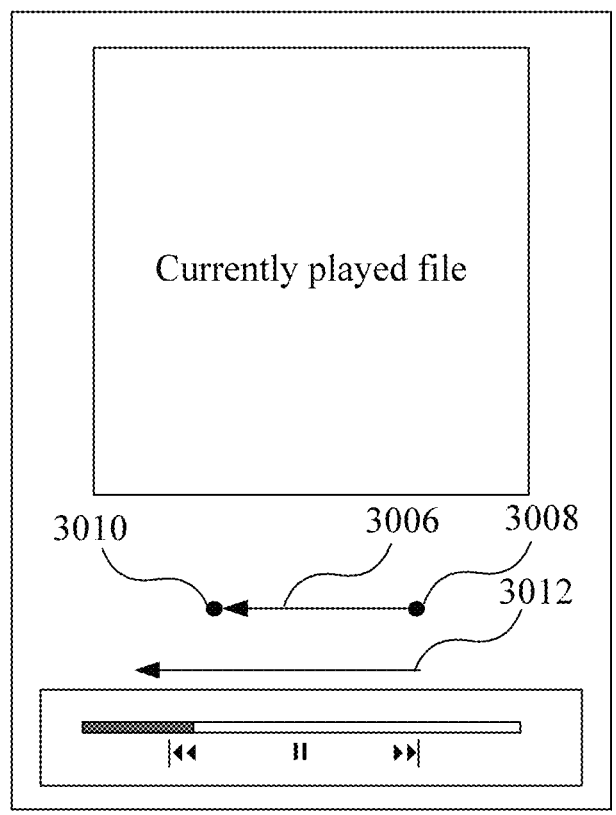
FIG. 3B is another schematic diagram of a step and play hybrid regulation operation according to an embodiment of the present disclosure.

In FIG. 3B, a gesture operation 3006 is shown, in which a start point is 3008, and an end touch point is 3010. The gesture operation has a direction B to left horizontally. A distance between the point 3008 and the point 3010 is the moving distance of the step and play hybrid regulation operation on the touchscreen. The terminal adjusts the step speed according to the moving distance obtained through calculation, and the terminal then regulates the play progress backward based on an adjusted step speed, that is, performs fast backward.

FIG. 3B further shows a gesture operation 3012. A moving distance of the gesture operation 3012 is greater than that of the gesture operation 3006, and therefore a step speed is also greater.

If the user performs a gesture operation in contact with the touchscreen, when the touchscreen fails to sense an input of the user, the current operation ends. If a floating operation is used, when a sensor fails to sense the floating operation, the current operation ends. After the step and play hybrid regulation operation ends, the adjusted step speed may be saved in the terminal.

It should be noted that, if the touchscreen or the sensor can still sense an input of the user, the step and play hybrid regulation operation is still not ended. The terminal continues to adjust the step speed according to a moving distance between a start touch point and a current touch point. In such a manner, the step speed may be adjusted to a most suitable state.

It should be noted that, in consideration of a personal error of an input of the user, the direction A of the gesture operation 3000 and the direction B of the gesture operation 3006 are not necessarily strictly defined opposite directions in actual use, and are described in detail herein.

It is set that a horizontal direction along a play progress bar is an X-axis, a trigger point triggering the step and play hybrid regulation operation is a zero point, a right side of the zero point is a positive direction of the X-axis, and a left side of the zero point is a negative direction of the X-axis. In the positive direction of the X-axis, a direction within ±45 degrees (°) is considered as the direction A. In the negative direction of the X-axis, a direction within ±45° is considered as the direction B.

Figure 4:
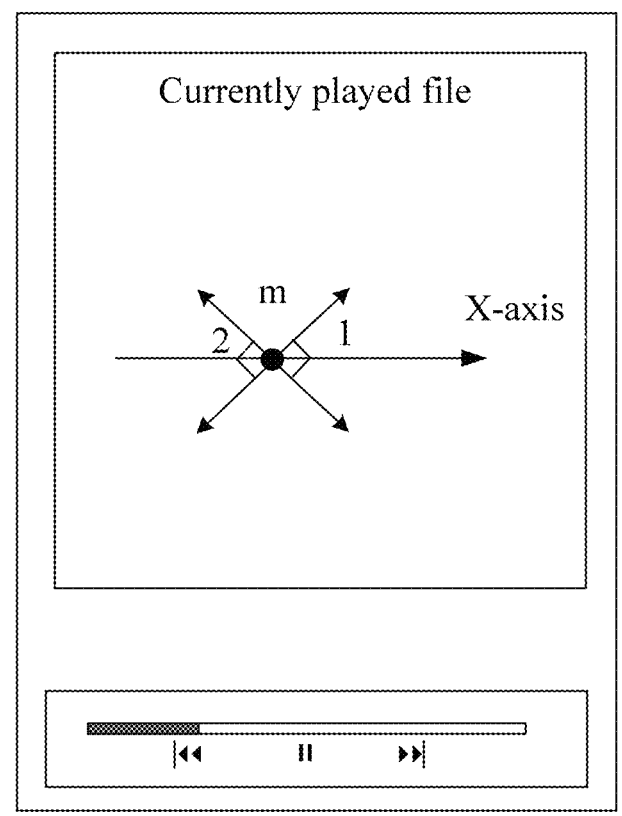
FIG. 4 is a schematic diagram of a first direction and a second direction according to an embodiment of the present disclosure.

A specific schematic diagram of the direction A and the direction B is shown in FIG. 4. A direction indicated by an arrow is the positive direction of the X-axis, m is the trigger point (zero point), ∠1 is 90°, an angular bisector of ∠1 is a positive half axis of the X-axis, ∠2 is 90°, and an angular bisector of ∠2 is a negative half axis of the X-axis. If an angle of the direction of the step and play hybrid regulation operation is within ∠1, it is considered that the direction of the step and play hybrid regulation operation is the direction A. If an angle of the direction of the step and play hybrid regulation operation is within ∠2, it is considered that the direction of the step and play hybrid regulation operation is the direction B. The sizes of the angles ∠1 and ∠2 may further be other values within 180°.

In the foregoing embodiment of the present disclosure, the step and play hybrid regulation operation entered by the user may be a gesture operation or a stylus operation. In addition, the operation of the user may be an operation in contact with the touchscreen, or a floating operation. In a case of a floating operation, a sensor is disposed on the terminal to sense the floating operation.

In a case of an operation in contact with the touchscreen, when a finger of the user or a stylus leaves the touchscreen, the step and play hybrid regulation operation ends. In a case of a floating operation, when the sensor of the terminal fails to sense the floating operation, or a distance between a position of the floating operation sensed by the sensor and the terminal exceeds a specified distance, the step and play hybrid regulation operation ends.

In the play regulation method provided in this embodiment of the present disclosure, a direction of a step and play hybrid regulation operation and a moving distance of the step and play hybrid regulation operation on a touchscreen are detected, a step speed is adjusted according to the moving distance, and play progress is regulated based on an adjusted step speed. Regulation of the step speed and regulation of the play progress are integrated, so that regulation of the play progress is more accurate, and misoperations can be reduced.

Figure 5:
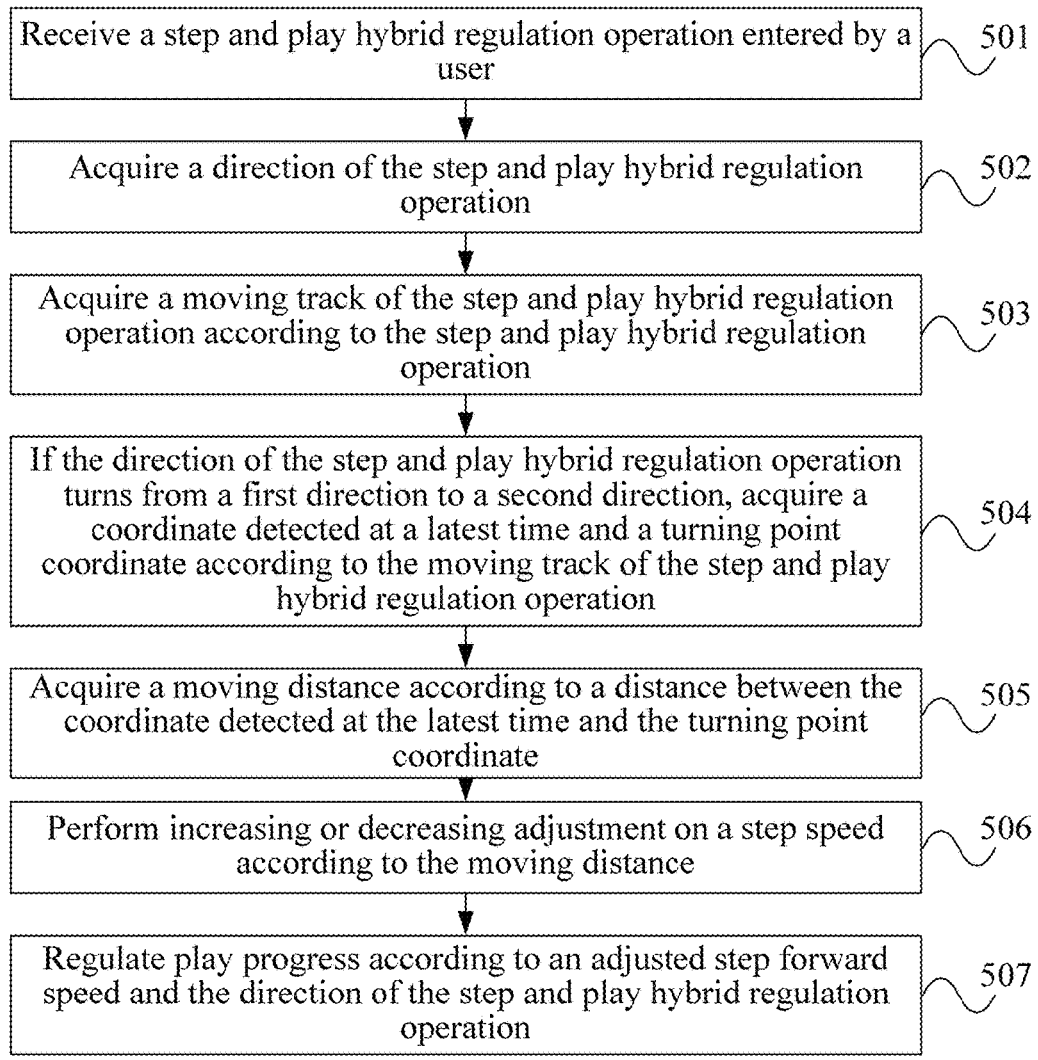
FIG. 5 is a flowchart of another play regulation method according to an embodiment of the present disclosure.

In addition, an embodiment of the present disclosure further provides a play regulation method, and as shown in FIG. 5, the method includes:

501: Receive a step and play hybrid regulation operation entered by a user.

502: Acquire a direction of the step and play hybrid regulation operation.

After step 502, a terminal performs a fast forward or fast backward operation according to the acquired direction and based on an existing step speed.

503: Acquire a moving track of the step and play hybrid regulation operation according to the step and play hybrid regulation operation.

504: If the direction of the step and play hybrid regulation operation turns from a first direction to a second direction, acquire a coordinate detected at a latest time and a turning point coordinate according to the moving track of the step and play hybrid regulation operation.

505: Acquire a moving distance according to a distance between the coordinate detected at the latest time and the turning point coordinate.

506: Perform increasing or decreasing adjustment on the step speed according to the moving distance.

507: Regulate play progress according to an adjusted step speed and the direction of the step and play hybrid regulation operation.

The terminal detects a touchscreen at a preset time interval, so as to acquire the moving track. A coordinate, of the moving track, detected last based on a time sequence is the coordinate detected at the latest time of the step and play hybrid regulation operation on the touchscreen. The turning point coordinate is the first coordinate detected by the terminal after the direction of the step and play hybrid regulation operation turns from the first direction to the second direction.

Figure 6A:
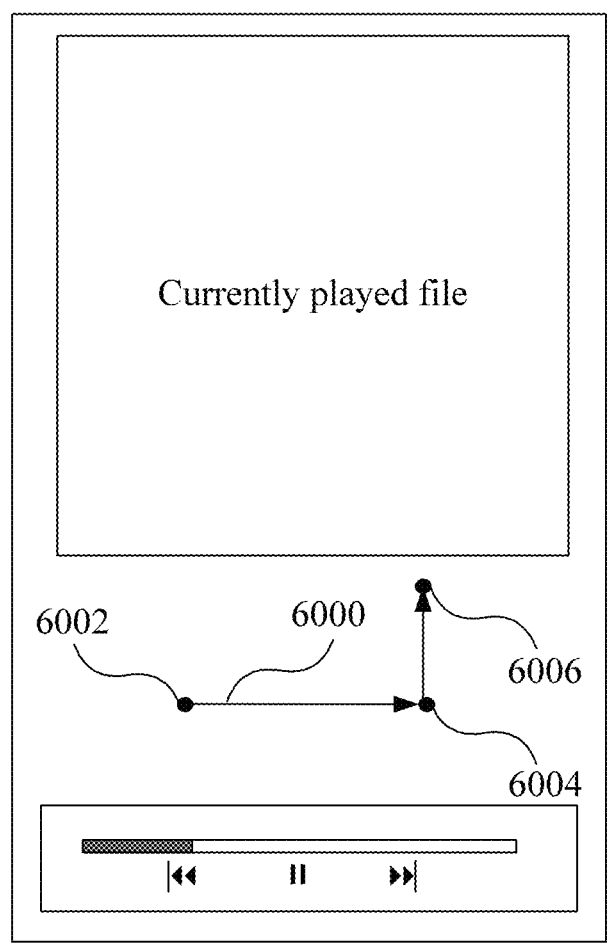
FIG. 6A is a schematic diagram of another step and play hybrid regulation operation according to an embodiment of the present disclosure.
Figure 6B:
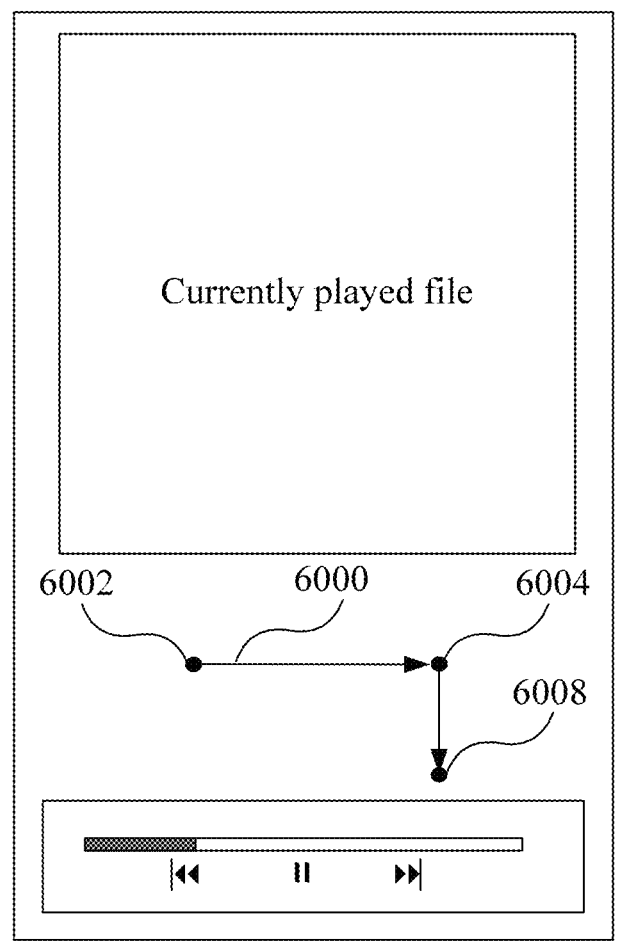
FIG. 6B is a schematic diagram of another step and play hybrid regulation operation according to an embodiment of the present disclosure.

In addition, the first direction and the second direction are different by a preset angle. For example, the preset angle is set to a range from 75 degrees to 115 degrees, a direction within 75 degrees to 115 degrees counterclockwise from the first direction is the second direction, and 90 degrees is preferred. As shown in FIG. 6A, a direction from a point 6002 to a point 6004 is the first direction, a direction from the point 6004 to a point 6006 is the second direction, or, a direction within 75 degrees to 115 degrees counterclockwise from the first direction is the second direction, and 90 degrees is preferred. As shown in FIG. 6B, a direction from the point 6002 to the point 6004 is the first direction, and a direction from the point 6004 to a point 6008 is the second direction.

According to the description of step 502 to step 507, after the terminal receives the step and play hybrid regulation operation, if the direction of the step and play hybrid regulation operation is the first direction, the terminal regulates the play progress forward or backward based on an existing step speed stored in the terminal. In addition, the terminal acquires the moving track of the step and play hybrid regulation operation. If the terminal detects that the direction of the step and play hybrid regulation operation turns from the first direction to the second direction, the coordinate detected at the latest time and the turning point coordinate are acquired according to the moving track of the step and play hybrid regulation operation. The moving distance is acquired according to the distance between the coordinate detected at the latest time and the turning point coordinate, so as to perform increasing or decreasing adjustment on the step speed according to the moving distance, and the play progress is regulated according to the adjusted step speed and the direction of the step and play hybrid regulation operation.

The foregoing process is described below with reference to FIG. 6A to FIG. 6D. In FIG. 6A to FIG. 6D, the step and play hybrid regulation operation is a gesture operation.

As shown in FIG. 6A, a gesture operation 6000 exists in a horizontal direction from left to right along a progress bar. A start touch point is 6002, and a direction in which the gesture operation 6000 moves from the point 6002 to the point 6004 is the first direction. After detecting the first direction of the gesture operation 6000, the terminal regulates the play progress forward according to an existing step speed. At the same time, the terminal continues to detect movement of the gesture operation 6000.

The second direction is described in two cases. In one case, a direction from the point 6004 to the point 6006 is the second direction. When it is detected that the gesture operation 6000 moves from the point 6004 to the point 6006 in a vertical direction, a coordinate detected at a latest time and a turning point coordinate are acquired. A turning point is the point 6004, the coordinate detected at the latest time is the point 6006, and according to a distance between a coordinate of the turning point 6004 and a coordinate of 6006, increasing adjustment is performed on the existing step speed.

In the other case, as shown in FIG. 6B, a direction from the point 6004 to the point 6008 is the second direction. When it is detected that the gesture operation 6000 moves from the point 6004 to the point 6008, a coordinate detected at a latest time and a turning point coordinate are acquired. A turning point is the point 6004, the coordinate detected at the latest time is the point 6008, and according to a distance between the coordinate of the turning point 6004 and a coordinate of 6008, decreasing adjustment is performed on the existing step speed.

Figure 6C:
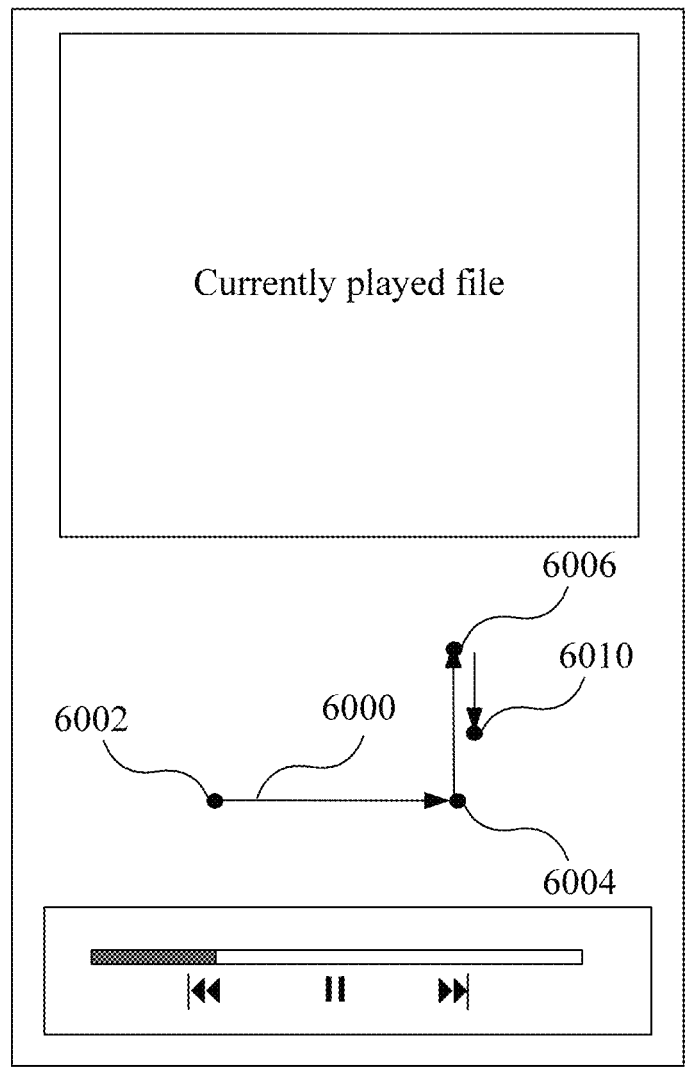
FIG. 6C is a schematic diagram of another step and play hybrid regulation operation according to an embodiment of the present disclosure.

Furthermore, after increasing or decreasing adjustment is performed on the existing step speed, the terminal continues to detect whether the gesture operation of the user turns around in the second direction. As shown in FIG. 6C, the point 6006 is a turn-around point, and the gesture operation moves vertically downwards to a point 6010. When turning around occurs in the second direction, the terminal decreases the step speed according to a distance between a coordinate of the point 6010 and the coordinate of the turning point 6004. It should be pointed out that in a process from the point 6002 to the point 6004 and then to the point 6006 and the point 6010, the entire gesture operation is continuous. If the user inputs with a finger or a stylus, the finger or the stylus does not leave the touchscreen. If a floating operation is performed for input, the floating operation does not leave a sensing range. Once the finger or the stylus leaves the touchscreen, or the floating operation leaves the sensing range, the current step and play hybrid regulation operation ends.

Figure 6D:
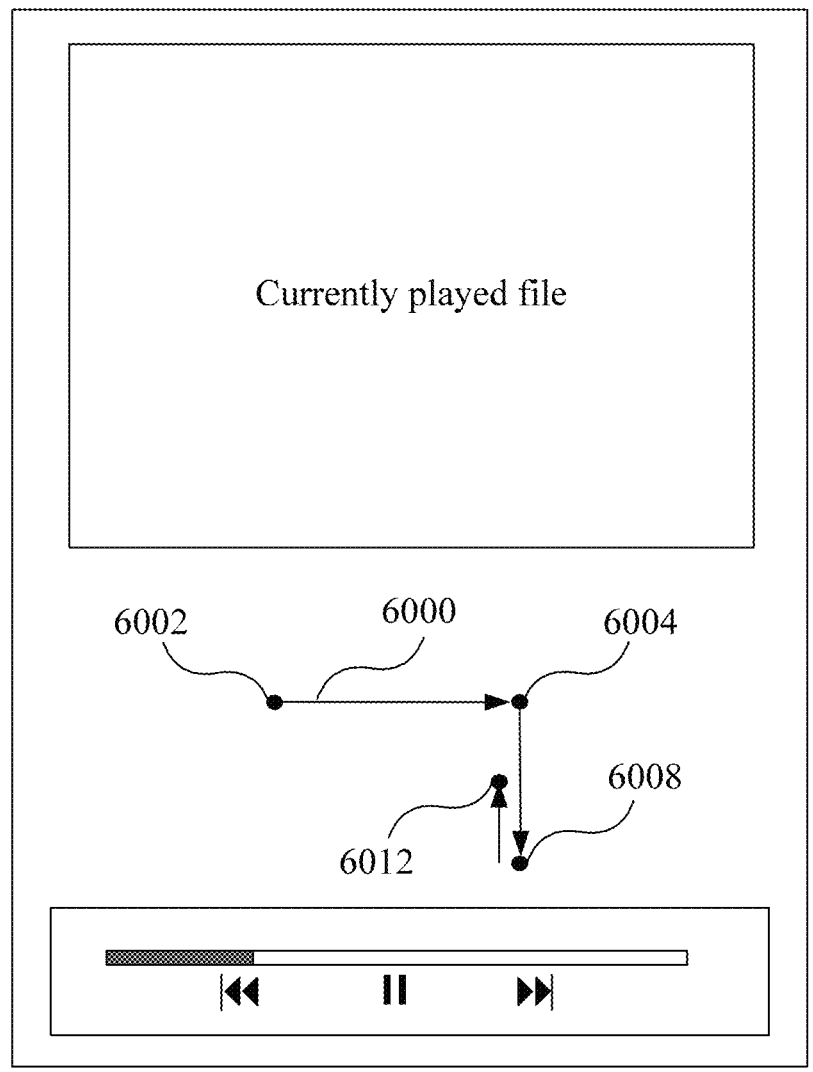
FIG. 6D is a schematic diagram of another step and play hybrid regulation operation according to an embodiment of the present disclosure.

The other case is shown in FIG. 6D. A direction from the point 6002 to the point 6004 is the first direction, a direction from the point 6004 to the point 6008 is the second direction, the point 6008 is a turn-around point, and the gesture operation moves vertically upward to a point 6012. In this case, the terminal increases the step speed according to a distance between a coordinate of the point 6012 and the coordinate of the turning point 6004. It should be pointed out that in a process from the point 6002 to the point 6004 and then to the point 6008 and the point 6012, the entire gesture operation is continuous. If the user inputs with a finger or a stylus, the finger or the stylus does not leave the touchscreen. If a floating operation is performed for input, the floating operation does not leave a sensing range. Once the finger or the stylus leaves the touchscreen, or the floating operation leaves the sensing range, the current step and play hybrid regulation operation ends.

By means of the process in FIG. 6C and FIG. 6D above, the step and play hybrid regulation operation entered by the user may be adjusted for multiple times in a vertical direction, so as to obtain a more precise step speed.

In FIG. 6A to FIG. 6D above, the first direction is a direction horizontally to right along the play progress bar, and the terminal adjusts the play progress forward (that is, fast forward). In the other case, when the first direction is a direction horizontally to left along the play progress bar, the terminal adjusts the play progress backward (that is, fast backward). In this case, reference may be made to the description in FIG. 6A to FIG. 6D for the adjustment of the step speed, and details are not described again.

Figure 7:
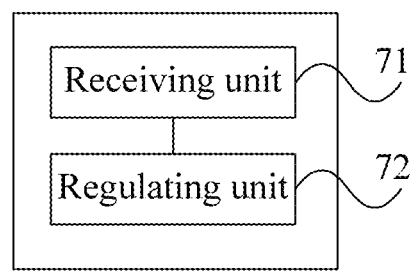
FIG. 7 is a schematic structural diagram of a play regulation apparatus according to an embodiment of the present disclosure.

In addition, an embodiment of the present disclosure further provides a play regulation apparatus. The apparatus is applied to a terminal having a media player and a touchscreen. As shown in FIG. 7, the apparatus includes a receiving unit 71 configured to receive a step and play hybrid regulation operation entered by a user, where the step and play hybrid regulation operation includes an adjustment instruction for a step speed and a regulation instruction for play progress; and a regulating unit 72 configured to regulate the step speed and the play progress according to the step and play hybrid regulation operation received by the receiving unit 71.

Figure 8:
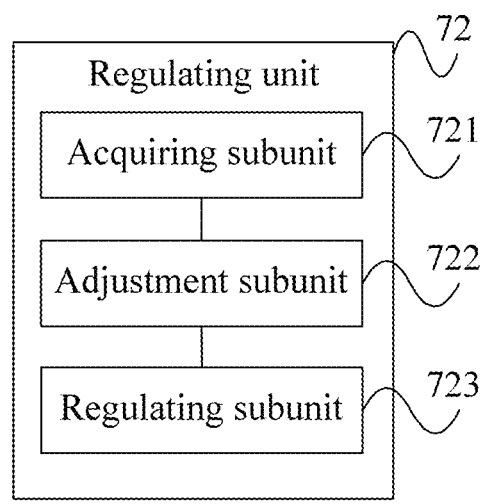
FIG. 8 is a schematic structural diagram of a regulating unit according to an embodiment of the present disclosure.

Further, as shown in FIG. 8, the regulating unit 72 includes an acquiring subunit 721 configured to acquire a direction of the step and play hybrid regulation operation and a moving distance of the step and play hybrid regulation operation on the touchscreen according to the step and play hybrid regulation operation; an adjustment subunit 722 configured to perform increasing or decreasing adjustment on the step speed according to the moving distance acquired by the acquiring subunit 721; and a regulating subunit 723 configured to regulate the play progress according to an adjusted step speed and the direction.

The terminal stores a correspondence between a length value of a moving distance and a step speed.

Figure 9:
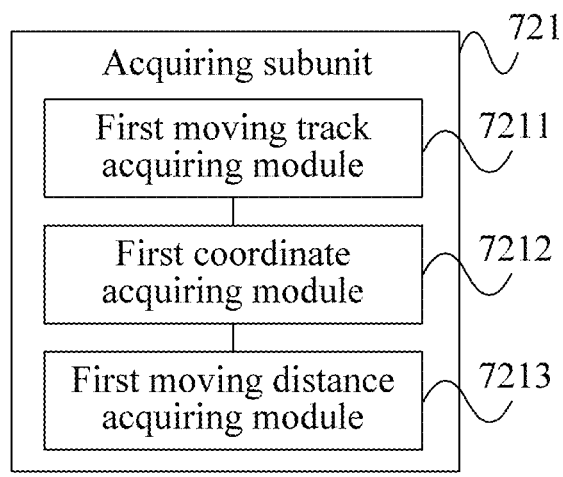
FIG. 9 is a schematic structural diagram of an acquiring subunit according to an embodiment of the present disclosure.

Further, as shown in FIG. 9, the acquiring subunit 721 includes a first moving track acquiring module 7211 configured to acquire a moving track of the step and play hybrid regulation operation according to the step and play hybrid regulation operation; a first coordinate acquiring module 7212 configured to acquire a coordinate detected at a latest time and a starting point coordinate of the step and play hybrid regulation operation according to the moving track; and a first moving distance acquiring module 7213 configured to acquire the moving distance according to a distance between the coordinate detected at the latest time and the starting point coordinate that are acquired by the first coordinate acquiring module 7212.

The terminal detects the touchscreen at a preset time interval, so as to acquire the moving track, a coordinate, of the moving track, detected first based on a time sequence is the starting point coordinate of the step and play hybrid regulation operation on the touchscreen, and a coordinate, of the moving track, detected last based on a time sequence is the coordinate detected at the latest time of the step and play hybrid regulation operation on the touchscreen.

Figure 10:
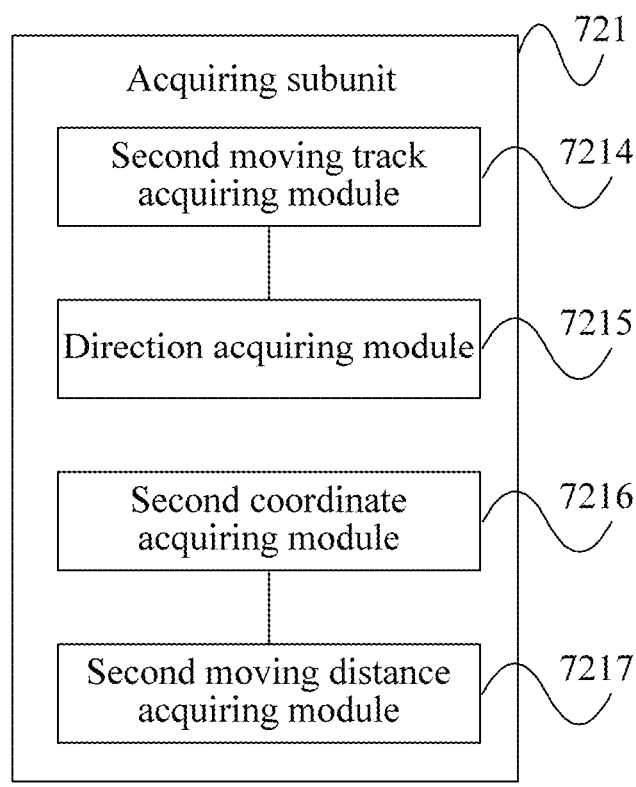
FIG. 10 is another schematic structural diagram of an acquiring subunit according to an embodiment of the present disclosure.

In another implementation manner, as shown in FIG. 10, the acquiring subunit 721 includes a second moving track acquiring module 7214 configured to acquire a moving track of the step and play hybrid regulation operation according to the step and play hybrid regulation operation; a direction acquiring module 7215 configured to acquire the direction of the step and play hybrid regulation operation according to the step and play hybrid regulation operation; a second coordinate acquiring module 7216 configured to, when the direction that is of the step and play hybrid regulation operation and acquired by the direction acquiring module 7215 turns from a first direction to a second direction, acquire a coordinate detected at a latest time and a turning point coordinate according to the moving track of the step and play hybrid regulation operation; and a second moving distance acquiring module 7217 configured to acquire the moving distance according to a distance between the coordinate detected at the latest time and the turning point coordinate that are acquired by the second coordinate acquiring module 7216.

The terminal detects the touchscreen at a preset time interval, so as to acquire the moving track, a coordinate, of the moving track, detected last based on a time sequence is the coordinate detected at the latest time of the step and play hybrid regulation operation on the touchscreen, and the turning point coordinate is the first coordinate detected by the terminal after the direction of the step and play hybrid regulation operation turns from the first direction to the second direction.

The first direction and the second direction are different by a preset angle.

In the embodiments of the present disclosure, the step and play hybrid regulation operation entered by the user may be a gesture operation or a stylus operation. In addition, the user operation may be an operation in contact with the touchscreen, or a floating operation. In a case of a floating operation, a sensor is disposed on the terminal to sense the floating operation.

In a case of an operation in contact with the touchscreen, when a finger of the user or a stylus leaves the touchscreen, the step and play hybrid regulation operation ends. In a case of a floating operation, when the sensor of the terminal fails to sense the floating operation, or a distance between a position of the floating operation sensed by the sensor and the terminal exceeds a specified distance, the step and play hybrid regulation operation ends.

Figure 11:
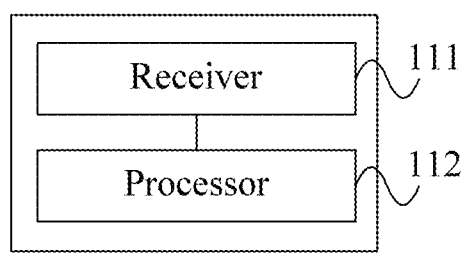
FIG. 11 is a schematic structural diagram of another play regulation apparatus according to an embodiment of the present disclosure.

In addition, as shown in FIG. 11, an embodiment of the present disclosure further provides a play regulation apparatus, applied to a terminal having a media player and a touchscreen, and the apparatus includes a receiver 111 and a processor 112.

The receiver 111 is configured to receive a step and play hybrid regulation operation entered by a user. The step and play hybrid regulation operation includes an adjustment instruction for a step speed and a regulation instruction for play progress.

The processor 112 is configured to regulate the step speed and the play progress according to the step and play hybrid regulation operation received by the receiver.

That the processor 112 regulates the step speed and the play progress according to the step and play hybrid regulation operation includes acquiring a direction of the step and play hybrid regulation operation and a moving distance of the step and play hybrid regulation operation on the touchscreen according to the step and play hybrid regulation operation, performing increasing or decreasing adjustment on the step speed according to the moving distance, and regulating the play progress according to an adjusted step speed and the direction, where the terminal stores a correspondence between a length value of a moving distance and a step speed. Further, that the processor 112 acquires a moving distance of the step and play hybrid regulation operation on the touchscreen according to the step and play hybrid regulation operation includes acquiring a moving track of the step and play hybrid regulation operation according to the step and play hybrid regulation operation, acquiring a coordinate detected at a latest time and a starting point coordinate of the step and play hybrid regulation operation according to the moving track, and acquiring the moving distance according to a distance between the coordinate detected at the latest time and the starting point coordinate.

The terminal detects the touchscreen at a preset time interval, so as to acquire the moving track, a coordinate, of the moving track, detected first based on a time sequence is the starting point coordinate of the step and play hybrid regulation operation on the touchscreen, and a coordinate, of the moving track, detected last based on a time sequence is the coordinate detected at the latest time of the step and play hybrid regulation operation on the touchscreen.

In another implementation manner of the present disclosure, that the processor 112 acquires a moving distance of the step and play hybrid regulation operation on the touchscreen according to the step and play hybrid regulation operation includes acquiring a moving track of the step and play hybrid regulation operation according to the step and play hybrid regulation operation, and acquiring the direction of the step and play hybrid regulation operation according to the step and play hybrid regulation operation; if the direction of the step and play hybrid regulation operation turns from a first direction to a second direction, acquiring a coordinate detected at a latest time and a turning point coordinate according to the moving track of the step and play hybrid regulation operation; and acquiring the moving distance according to a distance between the coordinate detected at the latest time and the turning point coordinate.

The terminal detects the touchscreen at a preset time interval, so as to acquire the moving track, a coordinate, of the moving track, detected last based on a time sequence is the coordinate detected at the latest time of the step and play hybrid regulation operation on the touchscreen, and the turning point coordinate is the first coordinate detected by the terminal after the direction of the step and play hybrid regulation operation turns from the first direction to the second direction.

The first direction and the second direction are different by a preset angle.

According to the play regulation apparatus provided in this embodiment of the present disclosure, a terminal receives a step and play hybrid regulation operation of a user, and regulates a step speed and play progress according to the step and play hybrid regulation operation. Regulation of the step speed and regulation of the play progress are integrated, so that regulation of the play progress is more accurate, and misoperations can be reduced.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:
1. A play regulation method, applied to a terminal having a media player and a touchscreen, the method comprising:

receiving a step and play hybrid regulation operation entered by a user; and regulating a step speed and a play progress according to the step and play hybrid regulation operation, wherein the step and play hybrid regulation operation comprises both an adjustment operation for the step speed and a regulation operation for the play progress, wherein the step speed is a quantity of frames of a media file that are played within a unit time when the user performs a fast forward/fast backward operation on the media player, wherein the play progress is a position to which the media file is played, and wherein regulating the step speed and the play progress according to the step and play hybrid regulation operation comprises:

acquiring a direction of the step and play hybrid regulation operation and a moving distance of the step and play hybrid regulation operation on the touchscreen according to the step and play hybrid regulation operation;

performing increasing or decreasing adjustment on the step speed according to the moving distance; and regulating the play progress according to an adjusted step speed and the direction, wherein the terminal stores a correspondence between a length value of a moving distance and a step speed, wherein acquiring the moving distance of the step and play hybrid regulation operation on the touchscreen according to the step and play hybrid regulation operation comprises:

acquiring a moving track of the step and play hybrid regulation operation according to the step and play hybrid regulation operation;

acquiring the direction of the step and play hybrid regulation operation according to the step and play hybrid regulation operation;

acquiring, when the direction of the step and play hybrid regulation operation turns from a first direction to a second direction, a coordinate detected at a latest time and a turning point coordinate according to the moving track of the step and play hybrid regulation operation; and acquiring the moving distance according to a distance between the coordinate detected at the latest time and the turning point coordinate, wherein the terminal detects the touchscreen at a preset time interval, so as to acquire the moving track, wherein a coordinate, of the moving track, detected last based on a time sequence is the coordinate detected at the latest time of the step and play hybrid regulation operation on the touchscreen, wherein the turning point coordinate is a first coordinate detected by the terminal after the direction of the step and play hybrid regulation operation turns from the first direction to the second direction, and wherein the first direction and the second direction are different by a preset angle.

2. A play regulation apparatus, applied to a terminal having a media player and a touchscreen, the apparatus comprising:

a receiver configured to receive a step and play hybrid regulation operation entered by a user; and a processor configured to regulate a step speed and a play progress according to the step and play hybrid regulation operation received by the receiver, wherein the step and play hybrid regulation operation comprises an adjustment operation for the step speed and a regulation operation for the play progress, wherein the step speed is a quantity of frames of a media file that are played within a unit time when the user performs a fast forward/fast backward operation on the media player, wherein the play progress is a position to which the media file is played, and wherein the processor configured to regulate the step speed and the play progress comprises the processor configured to:

acquiring a direction of the step and play hybrid regulation operation and a moving distance of the step and play hybrid regulation operation on the touchscreen according to the step and play hybrid regulation operation;

performing increasing or decreasing adjustment on the step speed according to the moving distance; and regulating the play progress according to an adjusted step speed and the direction, wherein the terminal stores a correspondence between a length value of a moving distance and a step speed, and wherein the processor configured to acquire the moving distance comprises the processor configured to:

acquire a moving track of the step and play hybrid regulation operation according to the step and play hybrid regulation operation;

acquire the direction of the step and play hybrid regulation operation according to the step and play hybrid regulation operation;

acquire, when the direction of the step and play hybrid regulation operation turns from a first direction to a second direction, a coordinate detected at a latest time and a turning point coordinate according to the moving track of the step and play hybrid regulation operation; and acquire the moving distance according to a distance between the coordinate detected at the latest time and the turning point coordinate, wherein the terminal detects the touchscreen at a preset time interval, so as to acquire the moving track, wherein a coordinate, of the moving track, detected last based on a time sequence is the coordinate detected at the latest time of the step and play hybrid regulation operation on the touchscreen, wherein the turning point coordinate is a first coordinate detected by the terminal after the direction of the step and play hybrid regulation operation turns from the first direction to the second direction, and wherein the first direction and the second direction are different by a preset angle.

* * * * *